June 13, 1933.  K. FUKUSHIMA  1,914,327
PROTECTION OF ALTERNATING CURRENT ELECTRIC SYSTEMS
Filed Sept. 28, 1931
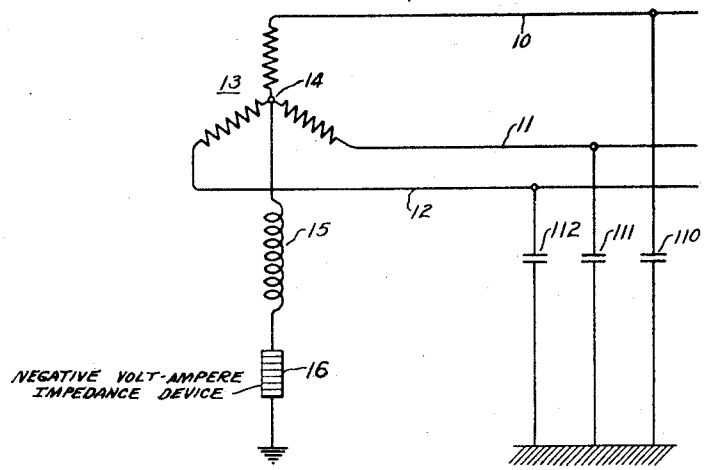
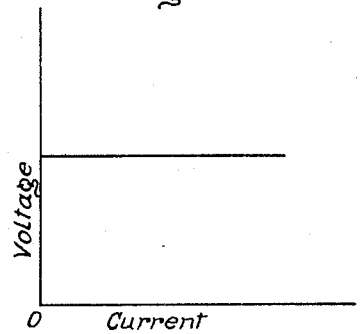
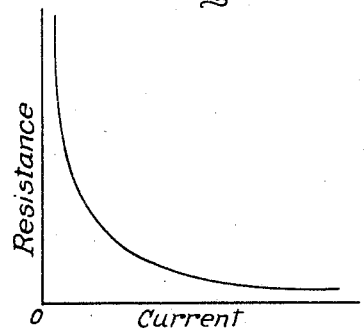
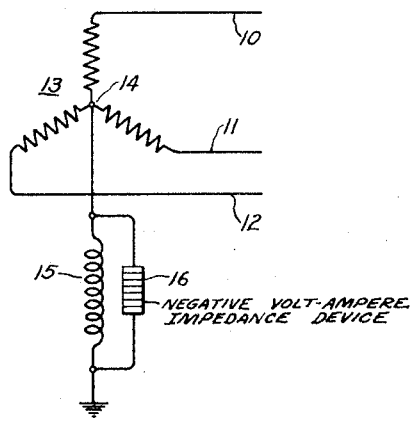
Inventor:
Komao Fukushima,
by Charles E. Sullan
His Attorney.

Patented June 13, 1933

1,914,327

UNITED STATES PATENT OFFICE

KOMAO FUKUSHIMA, OF TOKYO, JAPAN, ASSIGNOR TO GENERAL ELECTRIC COMPANY, A CORPORATION OF NEW YORK

PROTECTION OF ALTERNATING CURRENT ELECTRIC SYSTEMS

Application filed September 28, 1931, Serial No. 565,633, and in Japan October 6, 1930.

My invention relates to improvements in the protection of alternating current electric systems and more particularly to improvements in protective arrangements of the type disclosed in United States Letters Patent 1,537,371, granted May 12, 1925, on an application of Waldemar Petersen and assigned to the assignee of this application.

In this patent there is disclosed an arrangement for suppressing the ground fault capacitance current of an electric system by a lagging current flowing in an inductive connection to ground from a neutral point of the system, that is upon the occurrence of a ground fault on one conductor of the system there appears in the inductive connection a lagging current whose magnitude is sufficient to suppress the capacitance current to ground of the ungrounded conductor or conductors. As pointed out in the patent, the condition for an exact balance of the leading and lagging currents establishes a circuit which is resonant at the normal frequency of the system with the capacitance to ground of the system.

Because of the requirements of construction, it is practically impossible to make the resultant capacitance current to ground of a system equal to zero. Consequently, the voltage of the system neutral point normally is not zero. By reason of series resonance in the circuit including the inductive device or earthing coil of the neutral to ground connection and the capacitance to ground of the system, dangerous phenomena, depending on the residual or neutral voltage and the energy loss in the resonant circuit, may occur. If the resultant capacitance current to ground is large and the energy loss of the resonant circuit is small, the neutral point voltage may be raised to dangerous values. The resultant capacitance current when an arcing ground occurs is increased and, if the energy loss of the resonant circuit is large, then the voltage to ground at the fault is quickly restored. The arc extinguishing action may, therefore, be rendered ineffective. Moreover, switching transients due to the failure of a switch to open every phase conductor may result in abnormally high voltages due to resonance with the capacitance to ground of one or more phase conductors.

An object of my invention is to prevent these dangerous resonant phenomena without interfering with the intended action of the earthing coil and without the necessity of any switches or other controlling devices embodying movable elements. In accordance with my invention, I provide in circuit with the inductive connection from a system neutral point to ground an impedance means having a negative volt-ampere characteristic.

My invention will be better understood from the following description when considered in connection with the accompanying drawing and its scope will be pointed out in the appended claims.

In the accompanying drawing, Fig. 1 illustrates diagrammatically one embodiment of my invention. Figs. 2 and 3 are curves showing ideal characteristics of a resistance material for use in carrying out my invention and Fig. 4 illustrates diagrammatically a modification of my invention.

Referring now to Fig. 1, the conductors 10, 11, 12 of a polyphase alternating current electric system are connected to the windings of a transformer 13 which may be a grounding transformer and which has a neutral point 14. The capacitances to ground of the conductors 10, 11 and 12 are represented by 110, 111 and 112 respectively. In the neutral to ground connection there is connected an inductive device or earthing coil 15 whose inductance is proportioned according to the disclosure of the aforesaid Petersen patent.

In accordance with my invention, I connect in circuit with the neutral to ground connection an impedance device 16 which tends to maintain an approximately constant voltage across itself independently of the amount of current which is flowing in it, as ideally represented in Fig. 2. For such a device there may be used a resistance material of the type disclosed in United States Letters Patent No. 1,822,742, granted September 8, 1931, to the assignee of the present invention. This material has a negative volt-ampere characteristic without time lag, regardless of the rate of change of applied voltage. The characteristic of this resistance material may be represented by $I=KE^n$, where I and E represent respectively the current in and the voltage across the resistance, K being a constant and $n$ a number greater than 1. The greater the value of $n$, the more nearly does the current-resistance characteristic of the material approach the ideal, that is IR equals a constant or the hyperbolic characteristic, shown in Fig. 3.

As shown in Fig. 1, the resistance 16 is connected in series relation with the neutral to ground connection. It will be apparent to those skilled in the art that this may be done either directly as shown or the resistance may be connected in series relation to a transformer in the neutral to ground connection.

With the arrangement shown in Fig. 1, if the resultant of the capacitances 110, 111, 112 is other than zero and tends to raise the neutral voltage because of resonance with the coil 15 and thus cause a large current to flow in the neutral to ground connection, the ohmic value of the resistance 16 is so large as to limit this current flow and thereby hold the voltage of the neutral at a safe value. However, on the occurrence of a ground on one of the conductors, the voltages to ground of the other two conductors are raised to the line to line value and line to ground voltage appears across the inductive connection. The resistance 16 automatically adapts itself to the rise in voltage and permits sufficient lagging current to flow to compensate the resultant capacitance current to ground of the ungrounded conductors. In this way, if the ground is of an arcing character, it will be suppressed. Thus, only under ground fault conditions, is resonance permitted.

In the embodiment of my invention shown in Fig. 4, the resistance is connected in parallel with the inductive connection. It will be apparent that the operation of this embodiment of my invention is analogous to the operation of the embodiment shown in Fig. 1. Thus the resistance 16 tends to maintain the voltage across the coil 15 from rising to a dangerous value regardless of resonant conditions and normal unbalance of the capacitance currents of the conductors. In other words, as the voltage to ground of the neutral point 14 tends to rise because of resonance between the inductance of the coil 15 and the residual capacitance of the system, the resistance of the automatically variable impedance means 16 decreases disproportionately to the increase in voltage, thereby impairing the resonant condition and limiting the voltage to ground of the neutral point to a predetermined value. In this embodiment of my invention, the resistance 16, by virtue of holding the voltage across the coil 15 at a predetermined low value, makes it possible to insulate the coil for line to ground voltage instead of requiring the line insulation which would be necessary by virtue of voltages reflected at the neutral and due to lightning transients.

It will be noted that in both of the illustrated embodiments of my invention, the action is entirely automatic and no switches or devices embodying moving elements are required.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. An alternating current electric system and an inductive connection between a neutral point of said system and ground, the inductance of said connection being of such a value as to form with the capacitance to ground of the system a series resonant circuit substantially tuned to the normal frequency of the system whereby, upon the occurrence of a ground fault on the system, the ground fault current is suppressed and means for normally suppressing the resonance of said circuit including a resistance connected in series relation with said inductive connection and having a characteristic $I=KE^n$, I and E representing respectively the current in and the voltage across the resistance, K being a constant and $n$ a number greater than 1.

2. An alternating current electric system including a plurality of conductors each normally differing from ground potential, an inductive connection from a neutral point of said system to ground, the inductance of said connection being such as to form with said capacitance to ground of the system a resonant circuit substantially tuned to the resonant frequency of the system whereby to furnish upon the grounding of one of said conductors a lagging current substantially equal to the leading current to ground of the ungrounded conductor or conductors of the system and means including a resistance connected in circuit with said inductive connection and having the characteristic $I=KE^n$, I and E representing respectively the current in and the voltage across the resistance, K being a constant and $n$ a number greater than 1 for permitting resonance of said circuit only under ground fault conditions.

3. An alternating current electric system and an inductive connection between a neutral point of said system and ground, the inductance of said connection being of such a value as to form with the capacitance to ground of the system a resonant circuit substantially tuned to the normal frequency of the system whereby, upon the occurrence of a ground fault on the system, the ground fault current is suppressed and means including a negative volt-ampere characteristic resistance connected in circuit with said connection for permitting resonance of said circuit only under ground fault conditions.

4. An alternating current electric system including a plurality of conductors each normally differing from ground potential, an inductive connection from a neutral point of said system to ground, the inductance of said connection being such that the lagging component of the current therein, upon the occurrence of an earth fault, is substantially equal to the capacitance current to ground of the ungrounded conductors of the system and impedance means connected in circuit with said inductive connection for normally preventing a balance between the lagging current therein and the resultant capacitance current to ground of the system operative to restore the balance between said currents on the occurrence of a ground fault on the system.

5. An alternating current electric system including a plurality of conductors each normally differing from ground potential, an inductive connection from a neutral point of said system to ground, the inductance of said connection being such that the lagging component of the current therein upon the occurrence of an earth fault is substantially equal to the capacitance current to ground of the ungrounded conductors of the system and impedance means connected in circuit with said inductive connection for preventing the voltage to ground of the neutral point from rising above a predetermined value due to resonance between the inductance of said connection and the normal capacitance to ground of the system.

6. An alternating current electric system including a plurality of conductors each normally differing from ground potential, an inductive connection from a neutral point of said system to ground, the inductance of said connection being such that the lagging component of the current therein upon the occurrence of an earth fault is substantially equal to the capacitance current to ground of the ungrounded conductors of the system and automatically variable impedance means connected in circuit with said inductive connection for impairing the resonance between the inductance of said connection and the normal capacitance to ground of the system whereby to prevent the voltage to ground of the neutral point from rising above a predetermined value.

In witness whereof, I have hereunto set my hand.

KOMAO FUKUSHIMA.